United States Patent [19]

Thompson et al.

[11] 4,160,231

[45] Jul. 3, 1979

[54] LOW FREQUENCY DIPOLE HYDROPHONE TRANSDUCER

[75] Inventors: John H. Thompson; George R. Douglas, both of Pittsburgh, Pa.; Charles R. Wilson, Glen Burnie, Md.

[73] Assignee: Westinghouse Electric Corp., Pittsburgh, Pa.

[21] Appl. No.: 352,820

[22] Filed: Apr. 19, 1973

[51] Int. Cl.[2] .......... H04B 13/00

[52] U.S. Cl. .......... 340/11; 310/26

[58] Field of Search .......... 340/37, 8, 9, 10, 11, 340/13; 310/26; 179/110 C

[56] References Cited

U.S. PATENT DOCUMENTS

| | | | |
|---|---|---|---|
| 2,160,876 | 6/1939 | Lakatos | 340/11 |
| 2,475,148 | 7/1949 | Massa | 179/110 C |
| 2,476,778 | 7/1949 | Smoluchowski | 340/11 UX |
| 2,962,695 | 11/1960 | Harris | 340/11 X |
| 2,974,530 | 3/1961 | Jaouen | 310/26 X |
| 3,160,848 | 12/1964 | Key, Jr. et al. | 340/11 X |
| 3,187,300 | 6/1965 | Brate | 340/10 |
| 3,207,958 | 9/1965 | Chang-Sun Chang | 310/26 X |

FOREIGN PATENT DOCUMENTS

| | | | |
|---|---|---|---|
| 1157266 | 11/1963 | Fed. Rep. of Germany | 179/110 C |

*Primary Examiner*—Harold J. Tudor
*Attorney, Agent, or Firm*—Dean Schron

[57] ABSTRACT

A dipole hydrophone which includes a radiation target for acoustic energy and a counterbalancing mass. A first multilaminar magnetostrictive arm is connected to the radiation target at its center gravity and a second multilaminar magnetostrictive arm is similarly connected to the center of gravity of the counterbalancing mass. The lower portion of each arm is slotted to define two legs, and a permanent magnet, in conjunction with the slotted structure forms a closed magnetic path for flux. Windings for sensing a change in flux are slipped over the leg portions, yielding a high gain device. The two arms are connected by a coupling member which is compliantly suspended from a support structure.

12 Claims, 10 Drawing Figures

LOW FREQUENCY DIPOLE HYDROPHONE TRANSDUCER

CROSS-REFERENCE TO RELATED APPLICATION

This application is related in subject matter to application Ser. No. 352,821 filed Apr. 19, 1973 and assigned to the assignee of the present invention.

BACKGROUND OF THE INVENTION

1. Field of the Invention

The invention in general relates to hydrophones, and in particular to a broadband low frequency magnetostrictive dipole hydrophone.

2. Description of the Prior Art

Dipole hydrophones, or receivers, respond to the pressure gradient of the acoustic wave in the medium in which it is operating and provide signals proportional to the particle velocity of the acoustic wave. A unique feature of a dipole hydrophone is its figure-8, or cosine directivity pattern. Such hydrophones find use not only in air, such as for example microphones, but also find use in the underwater environment for listening to low frequency noise, as may be produced by a submarine, for example.

Various dipole hydrophones have constructional limitations which would prevent their use under water. For example, some dipole hydrophones not only provide an output signal proportional to the ambient medium particle velocity, but also provide an unwanted output signal in response to hydrophone movement — that is, acceleration. The dipole hydrophone of the present invention produces a low frequency broadband dipole acoustic pattern, is rugged and economical to build, and has a long time reliability for in situ operations. In addition, force or moment inputs causing rectilinear or rotational acceleration are effectively cancelled.

SUMMARY OF THE INVENTION

The hydrophone of the present invention includes a coupling member to which is connected first and second multilaminar naagnetostrictive arms. The lower portion of each arm is slotted to define first and second legs around which are placed respective windings, or coils operable to sense any change in flux in the arms in response to the bending thereof. A permanent magnet is provided for establishing a biasing flux around the legs. The dynamic masses of the radiation target and counterbalancing mass are substantially equal and in one embodiment the radiation target is in the form of a disk, one-half of which is on one side of the magnetostrictive arm and the other half on the other side of the arm. The counterbalancing mass is in the form of a cylinder one-half of which is on one side of the second magnetostrictive arm, the other half on its other side. In another embodiment the counterbalancing mass is in the same form as the radiation target, however, it is provided with a plurality of apertures for allowing the ambient medium to pass therethrough.

DESCRIPTION OF THE PREFERRED EMBODIMENT

Figure 1:
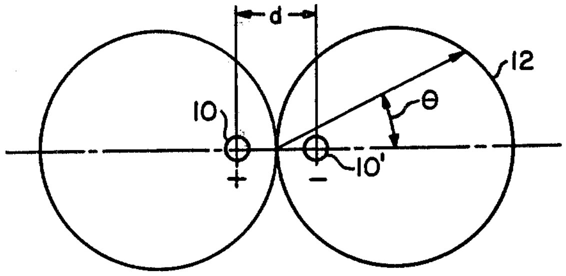
FIG. 1 illustrates the directivity pattern of a dipole hydrophone.

Referring now to FIG. 1, the dipole hydrophone may be represented by two small closely spaced transducers indicated by points 10 and 10', having opposite polarity. The signals from the two small transducers cancel for equal pressure, thus any net response is due to a pressure gradient across the dipole. In actuality, the points 10 and 10' may be the opposite sides or ends of a single element oscillating in a translational mode. If the points 10 and 10' are small with respect to the operating wavelength, and if the distance d between them is also small in comparison with a wavelength, for example, less than 1/10th $\lambda$, the directivity pattern will be a figure-8 pattern 12, also known as a cosine directivity pattern wherein the response is proportional to the cosine of the angle $\theta$.

Figure 2:
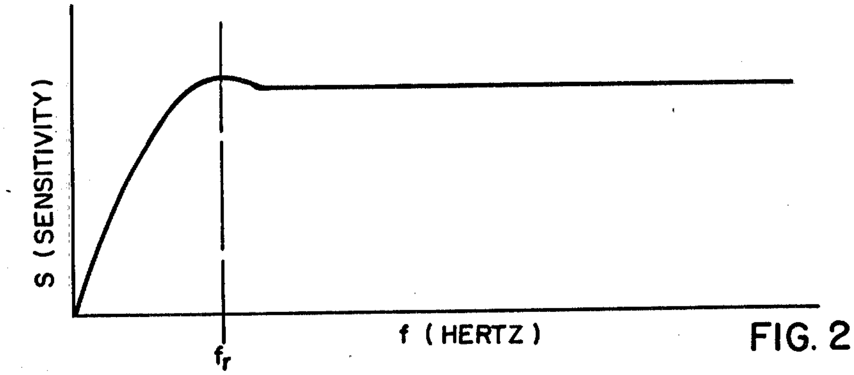
FIG. 2 illustrates a curve of sensitivity versus frequency for a dipole hydrophone of the present invention.

The present invention operates as a dipole hydrophone and is constructed and arranged to provide a frequency response such as illustrated in FIG. 2 wherein the vertical axis represents sensitivity (s), generally given in terms of output voltage relative to free field acoustic pressure, and wherein the horizontal axis represents frequency, in hertz. The hydrophone to be described provides a nearly constant frequency response above a point $f_r$ where $f_r$ may have a value of approximately 10 hz. The nearly constant response past $f_r$ continues for hundreds of hertz and encompasses a range for listening to acoustic noises produced by, for example, submarines and other underwater machinery.

Figure 3:
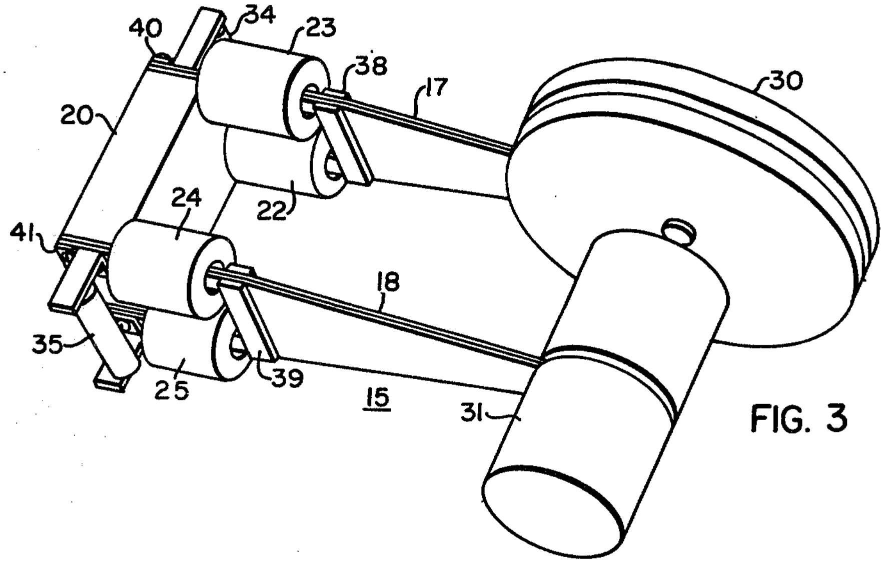
FIG. 3 is a view of one embodiment of the present invention.

Referring now to FIG. 3, illustrating one embodiment of the present invention, the hydrophone 15 includes first and second multilaminar magnetostrictive arm portions 17 and 18 connected to a nonmagnetic base or coupling member 20.

If a material exhibits a magnetostrictive effect, any change in the magnetic field results in a stress change and a proportional dimensional change in the magnetostrictive material, the vice versa — that is, any dimensional change results in a proportional change in magnetic characteristics. This latter feature is utilized in the hydrophone 15, and accordingly, there is provided winding means such as coils 22 and 23 associated with arm 17 and coils 24 and 25 associated with arm 18 to detect any change in magnetic flux.

The multilaminar magnetostrictive arms 17 and 18 may be of a well known bilaminar construction which includes a first layer of nickel and a second layer of a nickel-iron combination. The combination effects a bending of the arms as opposed to an elongation, upon the application of a magnetic field and conversely, any bending of the arms will provide a corresponding flux change and proportional signal in the associated winding means.

Connected to the first arm 17 is a radiation target 30 for acoustic energy which functions to bend arm 17 in response to the component of ambient medium particle velocity normal to said arm and to generate the said proportional signal in the winding means. For purposes of explanation, let it be assumed that the ambient medium is water. The radiation target is shown in the form of a disk or paddle, however, any configuration could be utilized which presents a relatively large area for the water particle impingement to cause bending of the arm 17.

Connected to the second arm 18 is a counterbalancing mass 31 of a size and shape to be substantially nonresponsive to the water particle velocity, such that no direct bending of the arm takes place in response thereto, and no resultant signal is generated in the associated windings 24 and 25.

If the entire hydrophone 15, however, is accelerated, such as by movements transmitted to the coupling member 20, then it is desired that no output signal be provided since the only meaningful signal desired is that due solely to water particle velocity and not to acceleration. In order to cancel any acceleration signals, the radiation target 30 and its associated arm 17 are designed to be dynamically equal to the counterbalancing mass 31 and its associated arm 18. With the arms 17 and 18 being equal in size, shape and mass, the radiation target 30 and counterbalancing mass 31 are designed to have substantially equal in-water dynamic masses and substantially equal mass moments of inertia.

More particularly, for cancelling of acceleration signals, the apparatus is designed such that the dynamic mass and consequent mass moment of inertia of the radiation target 30 are substantially equal respectively to the dynamic mass and mass moment of inertia of the counterbalancing mass 31. The dynamic mass refers to the apparent mass of the body during operation and is equivalent to the static mass or its mass in air plus the ambient medium mass, in the present example, its water mass. That is:

$$\text{dynamic mass} = \text{water mass} + \text{static mass}.$$

It is preferable that the dynamic masses be within 10% of one another. For the cylindrical shapes illustrated, the water mass may be calculated from the relationship $$\text{water mass} = (8/3)\rho a^3$$

where $\rho$ is the mass density of the water (kilograms/cubic meter) and a is the radius (meters) of the cylinder. Suppose, by way of example, that the radiation target 30 has a diameter of 0.0763 meters, and the counterbalancing mass has a diameter of 0.0254 meters — the water mass of the counterbalancing mass therefore would be in the order of 1/27th of the radiation target and substantially negligible with respect thereto. The masses outside of the water environment, therefore, are quite different, with that of the counterbalancing mass being greater than that of the radiation target. Since it is desirable to minimize the radiation response area of the counterbalancing mass 31 with respect to that of the radiation target 30, its density should be greater than that of the radiation target 30, and from a manufacturing standpoint, and by way of example, the counterbalancing mass 31 may be fabricated of stainless steel, and the radiation target 30 may be fabricated of lightweight aluminum.

In those instances where the radiation target 30 and/or the counterbalancing mass 31 are of an irregular shape, not subject to formula solution of water mass, the dynamic mass can still be determined from the relationship $$F = MA$$

where F is Force, M is Mass and A is Acceleration. The determination can be made by applying a known vibratory force F to the mass and measuring its acceleration by means of, for example, an accelerometer.

With respect to the mass moment of inertia, the rotational movement of an arm assembly about a point may be defined by the relationship $$T = I\alpha$$

where T is moment, or torque, I is mass moment of inertia, and $\alpha$ is angular acceleration. The formula is of the same form as $F=MA$ where resultant torque is the analogue of resultant force, angular acceleration is the analogue of linear acceleration, and the mass moment of inertia plays the same role as does mass or inertia in linear motion.

The design of the apparatus is such as to result in dynamic equality between both arms and the associated masses.

Situated at the lower portion of each of the arms 17 and 18 is a respective magnetic biasing arrangement 34 and 35, and the flux path for each arm is completed by a low reluctance path in the form of magnetic shunts 38 and 39 and 40 and 41 to be described subsequently.

Figure 4:
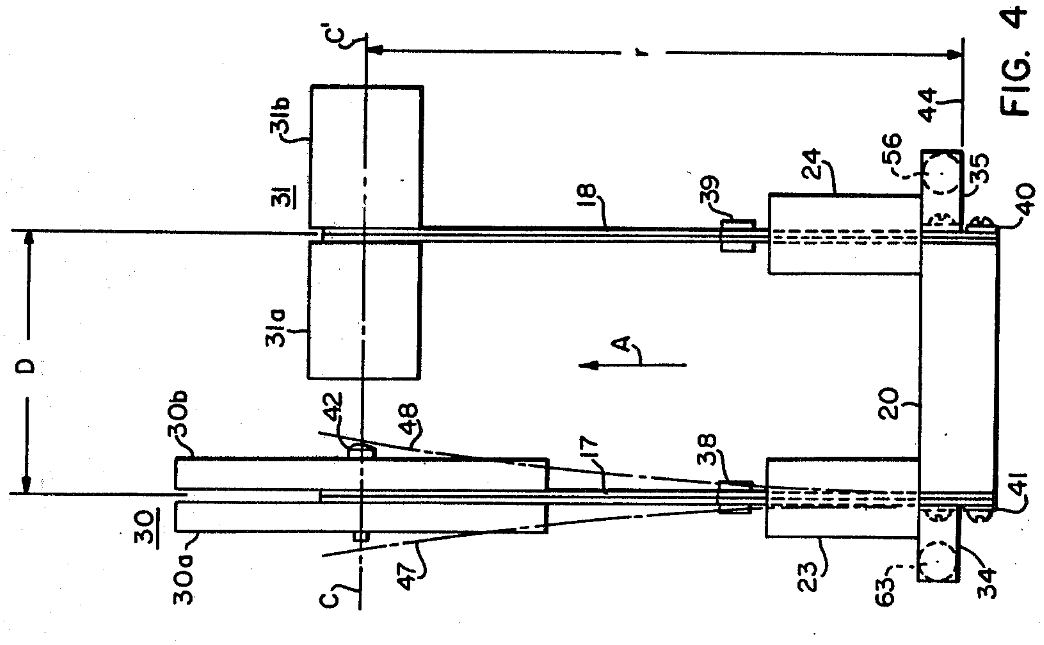
FIG. 4 is a plan view of the embodiment illustrated in FIG. 3.

FIG. 4 is another view, looking down on the view of the hydrophone of FIG. 3.

In response to water particle velocity, the radiation target 30 will move to cause bending of its associated arm to positive and negative limits, illustrated by the dotted lines 47 and 48 (which limits have been somewhat exaggerated for clarity). In response to that same water particle velocity causing movement of the arm 17 to positions intermediate 47 and 48, the minimal movement of counterbalancing mass 31 results in substantially no contribution to bending of the arm portion 18. If, however, the entire assembly is moved, the inertia will result in bending of both of the arms 17 and 18, and due to the dynamic equality, the movement will produce substantially equal signals in the associated windings 22–23 and 24–25; however, these signals are opposite and cancel one another, thereby resulting in hydrophone output signals which are the result of solely water particle velocity.

In order to eliminate unwanted signals caused by bending of the arms if the hydrophone moves in the direction of the arrow A, both the radiation target 30 and counterbalancing mass 31 are constructed and arranged such that their associated arms are attached to their respective centers of gravity.

The radiation target 30 is symmetrically disposed about the arm 17 in that it is made up of two parts 30*a* and 30*b* on opposite sides of the arm 17 and securd thereto by means of a bolt 42. Similarly, the counterbalancing mass 31 is made up of two pieces, 31*a* and 31*b* symmetrically disposed on either side of arm 18 and secured thereto by means of an internal bolt (not illustrated).

The center of gravity of the radiation target 30 is spaced from the center of gravity of the counterbalancing mass 31 by a distance D, and for the configuration illustrated the central axis C passing through the center of radiation target 30 is colinear with, and forms an extension of, the central axis C' of counterbalancing mass 31. In addition, each respective center of gravity is located at a distance r from a reference plane 44 passing through the coupling member 20.

Figure 5:
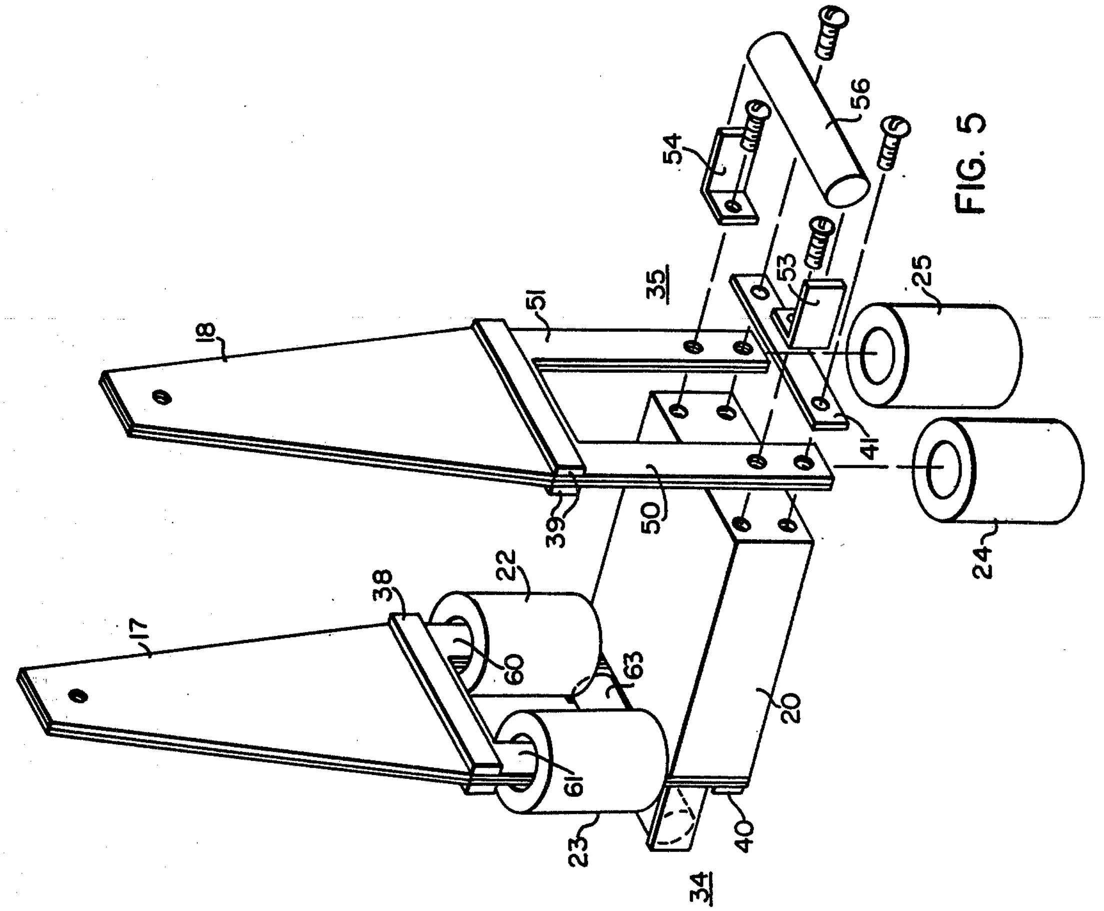
FIG. 5 is an exploded view of portions of the hydrophone.

An exploded view of the apparatus is illustrated in FIG. 5 to better show the upper and lower portions of the arms 17 and 18. The radiation target and counterbalancing mass have been omitted.

Multilaminar magnetostrictive bender arms per se are not new. They have been used in the past, for example as a phonograph pickup arm (without a radiation target) with the electrical windings being would about the bender arm. In the present invention, the arrangement is such as to provide a closed loop circuit for the magnetically conducting path. In addition, the construction of the magnetostrictive arms is such as to provide ease of winding insertion and in addition to provide room for many turns of the coil to thus establish a relative high gain. Describing arm 18 as exemplary, the lower portion thereof is slotted forming two legs 50 and 51, around which respective coils 24 and 25 may be easily slipped into place. The magnetic biasing arrangement 35 includes L-shaped brackets 53 and 54 secured to the lower ends of legs 50 and 51, respectively. These brackets hold a permanent magnet 56 for establishing a magnetic flux biasing circuit through the legs 50 and 51 and the low reluctance paths 39 and 41. In a similar manner, arm 17 includes a slotted lower portion, defining legs 60 and 61 with a permanent magnet 63 establishing a magnetic flux bias through the legs 60 and 61 and low reluctance path 38 and 40.

Figure 6:
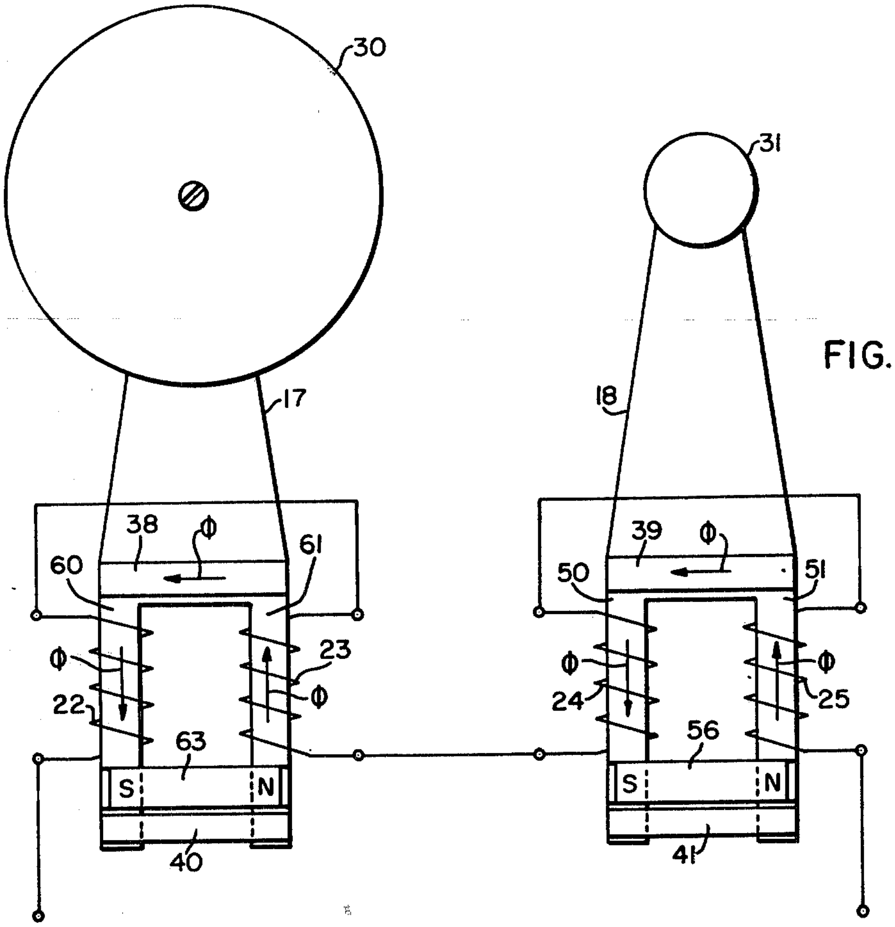
FIG. 6 illustrates the first and second arm portions of the hydrophone, with their associated windings.

FIG. 6 shows the arms 17 and 18, as would be viewed from the permanent magnet side thereof, in order to illustrate the flux and winding relationships. With respect to arm 17, the permanent magnet having its north end adjacent leg 61 sets up a biasing flux in the direction of the arrows $\phi$ in the loop containing leg 61, shunt 38 and leg 60. With respect to arm 18, the permanent magnet 56 having its north end adjacent leg 51 sets up a biasing flux as indicated by the arrows $\phi$ in the loop containing leg 51, shunt 39 and leg 50.

Winding 22 is serially connected to winding 23, which in turn is connected to the serial arrangement of windings 24 and 25. During operation of the hydrophone, the water particle velocity acting on radiation target 30 will cause the arm 17 to move between the dotted line positions 47 and 48 of FIG. 4. Due to the well known action of the bilaminar magnetostrictive construction, movement of the arm between these two positions will cause a resultant change in flux $\phi$. This change in flux manifests itself as a proportional voltage produced in the coils 22 and 23 which are connected such that the respectively produced voltages are additive. Whether the net flux increases or decreases depends, not only upon which way the arm moves, but is additionally dependent upon which lamination, that is, the iron or nickel-iron combination forms the outside lamination. In general, if the nickel is in tension, the flux decreases; and if the nickel-iron combination is in tension, the flux increases, such that for the arm 17 in FIG. 6, if the outside lamination is nickel and the arm is pushed toward dotted line position 48 (away from the viewer in FIG. 6), the nickel will be in tension, the nickel-iron combination will be in compression, and there will be a net flux decrease resulting in a proportional voltage $E=N(d\phi/dt)$ where N is the number of turns of the coils.

Due to the small area of the counterbalancing mass 31 presented to the water movement, arm 18 will not directly move in response to water particle velocity. Movement of arm 18 may occur, however, in response to movement of the entire hydrophone. The theory of operation is the same as that described with respect to the arm 17 in that movement of arm 18 causes a change in flux which generates corresponding voltages in the associated windings 24 and 25.

Although the counterbalancing mass 31 is nonresponsive to direct water particle velocity, the arm 18 may still move as a result of movement of arm 17. This will happen if the coupling member 20 is of a relatively small mass. In such instance there will be movement of arm 18 in an opposite direction to that of arm 17 due to the resultant reaction. With the coupling member of a relatively large mass, reaction forces from movement of arm 17 due to water impingement will not cause arm 18 to move. The use of large mass base, such as lead, is preferable. The operation of FIG. 6, therefore, is such that movement or vibration of the entire hydrophone causes movement of arms 17 and 18 in the same direction, resulting in generated voltages in their respective windings. The windings are electrically connected such that the voltages tend to cancel one another. A normal hydrophone output signal is obtained by impingement upon the radiation target 30, causing a corresponding signal to be generated in the windings associated with arm 17, which for some constructions and depending upon the mass of the coupling member 20, will be the only signals generated, or alternatively, will be additive to those signals generated by the reaction of arm 18.

Figure 7:
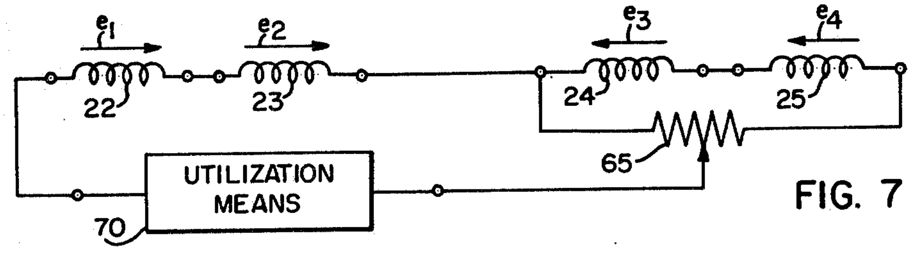
FIG. 7 is an electrical circuit diagram of the windings.

A great many variables exist in the arrangement of parts in that, for example, the arms can be reversed, the permanent magnet can be reversed, and the winding directions can be modified. FIG. 7 illustrates the basic electrical principles involved, and that is as follows. The windings associated with arm 17 produce a certain voltage dependent upon the flux change. In the embodiment thus far illustrated, winding 22 will produce a voltage $e_1$, and winding 22 will produce a voltage $e_2$ in the same direction as $e_1$, as indicated by the arrows. Due to the fact that the dynamic masses of 30 and 31 are equal, during hydrophone movement, the windings associated with arm 18 will provide voltages, illustrated as $e_3$ and $e_4$, both being additive with respect to one another, with $e_1$ and $e_2$ being opposite to $e_3$ and $e_4$, thereby resulting in a net output of 0. In order to dynamically balance this system, there may, if desired, be included trimming means, such as potentiometer 65, connected across a set of coils in order to compensate, for example, for any slight differences in mass, etc. The windings are connected to a utilization means 70 such as a meter, recording means, or a computer, to name a few. It is thus seen from FIG. 7 that signals produced by acceleration of the hydrophone are cancelled. Signals produced by the water particle velocity in one case will be generated only in the windings associated with arm 17, that is $e_1$ and $e_2$ and in another case will be produced by the additional generation in the windings associated with arm 18, in which case, $e_3$ and $e_4$ will be in the same direction as $e_1$ and $e_2$.

Figure 8:
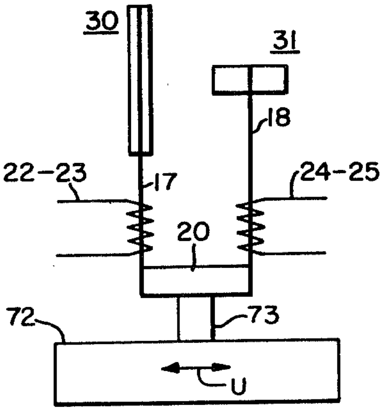
FIG. 8 is a simplified representation of a mounted hydrophone of the type illustrated in FIG. 4.
Figure 9:
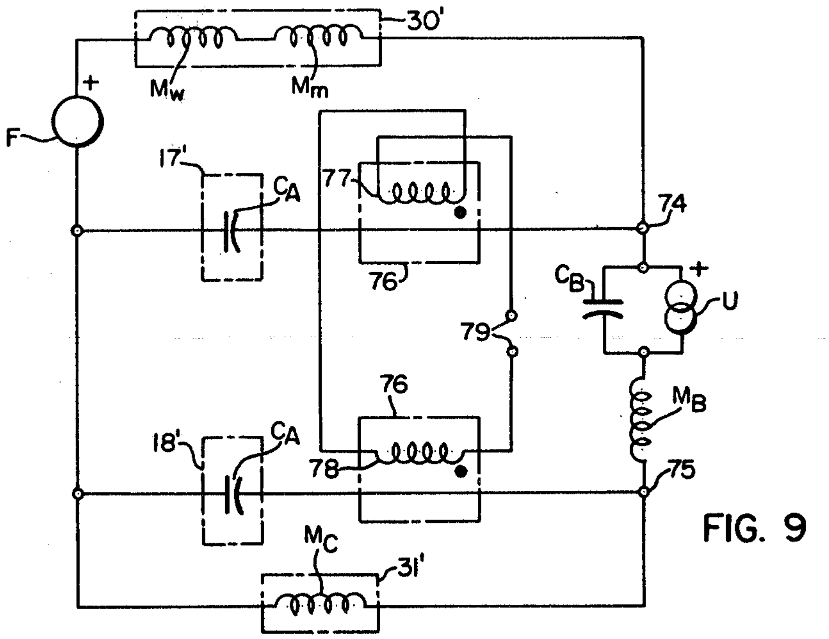
FIG. 9 is the electrical equivalent of the arrangement of FIG. 8.

A better understanding of the mechanical aspects of the hydrophone may be had by resorting to an electrical equivalent thereof and to this end reference is made to FIGS. 8 and 9, FIG. 8 illustrating the hydrophone being coupled to a support structure or case 72 through a highly compliant coupling 73, one example of which is butyl.

In the electrical-mechanical relationship the following analogues may be made

| Electrical | Mechanical |
|---|---|
| voltage | force |
| current | velocity |
| inductance | mass |
| capacitance | compliance |
| impedance | mechanical impedance |

Accordingly, in FIG. 9 the mass of the radiation target indicated by the numeral 30' is represented by inductors $M_w+M_m$ wherein $M_w$ is the water mass, and $M_m$ is the static mass, the both of them being equal to the dynamic mass as previously explained. Capacitor $C_A$ represents the compliance of the magnetostrictive arm 17 connected to the radiation target and is given the designation 17'. Similarly, the counterbalancing mass 31 is represented by the inductor $M_C$ and is designated by the numeral 31' and its respective arm, designated 18', also is represented by $C_A$. Connected in circuit between junction point 74 and 75 is a capacitor $C_B$ representing the compliance of the butyl, and inductor $M_B$ representing the mass of the coupling block 20.

Numerals 76 represent transform circuits which transform a velocity (current) into a corresponding voltage as provided by respective windings 77 and 78 connected to output terminals 79. A force generator F is included and represents the RMS actuation force on the disk radiation target. A velocity generator U comes into play when the support structure 72 is accelerated. The output of the generator F (equivalent to volts) is given by the formula:

$$F = \frac{16\pi}{3} \cdot \frac{a^3 f \cos\theta}{c} p_{ff}$$

where F=RMS actuating force, a=radius of disk, f=frequency, c=speed of sound in the medium, $\theta$=the angle between the target and the plane of the wave front, $p_{ff}$=RMS free field pressure of the acoustic wave and is related to the water particle velocity, the density of the water and the speed of sound therethrough.

The output of generator U is defined by: $U=A/2\pi f$ where A is the RMS Acceleration of the frame.

Three different situations will be described by means of the electrical circuit equivalent of FIG. 9, the first being the acoustic response in the situation where the coupling member 20 is of a relatively low mass, the second being where it is of a relatively high mass, and the third situation being one where the entire hydrophone is accelerated.

In discussing the electrical equivalent circuit the inductive and capacitor components will be assumed to have the following value designations:

Inductor $M_w$ — Inductance of $L_w$
Inductor $M_m$ — Inductance of $L_m$
Inductor $M_C$ — Inductance of $L_C$
Inductor $M_B$ — Inductance of $L_B$
Capacitor $C_A$ upper branch — Capacitance of $C_a$
Capacitor $C_A$ lower branch — Capacitance of $C_a$
Capacitor $C_B$ — Capacitance of $C_b$ Let it be assumed that the butyl coupling member 73 is very soft and therefore has a very high compliance. In such instance the value of capacitor $C_B$ is very high. The capacitance reactance $X_{CB}=1/2\pi fC_b$ therefore is low. With a relatively low mass the inductance value of $M_B$ is small and accordingly its inductive reactance $X_{MB}=2\pi fL_B$ is small.

Assuming current flow out of the positive side of generator F, the current divides at junction point 74 and proceeds from right to left in the upper branch containing $C_A$. The low reactance between junction point 74 and 75 may essentially be neglected and the other branch of current at junction point 74 divides at junction point 75 with a portion traveling from right to left in the lower branch containing $C_A$ and the remaining portion passing through $M_C$. The impedance (reactance) $M_C$ is equal to the impedance of $C_A$ at the frequency fr. At higher frequencies the impedance of $M_C$ predominates and most of the branch current flows through $C_A$ (18') thus the currents through the two branches containing $C_A$ will be approximately equal, causing voltages to be generated in windings 77 and 78, and which voltages are additive.

Examining now the second situation where the coupling member 20 is massive, the value of inductance for $M_B$, that is $L_B$, will be relatively high therefore presenting a high reactance ($X_{MB}= 2\pi fL_B$) to current flow. Negligible current therefore will flow from junction point 74 to 75 and substantially all of the current will cause an output voltage in winding 77.

In the third situation, the one where the entire hydrophone moves, an output signal will be provided by the generator U, the external vibration velocity of the support 72. (For purposes of explanation let it be assumed that generator F is not providing an output). If the butyl 73 were extremely compliant, the value of capacitance $C_b$ would be very high and its capacitance reactance ($X_{CB}=1/2\pi fC_b$) therefore would be very low. If the capacitance of $C_b$ was infinite the capacitive reactance would be zero and any output current provided by generator U would be short circuited, which in effect would be the same as saying that with a high enough compliance any motion of the hydrophone would be filtered out and would not affect the operation. However, such ideal situation is not possible and accordingly that output current provided by generator U which is not shorted by $C_B$ splits at junction 74 with a portion going from right to left through the upper branch containing $C_A$. A smaller portion of the current also flows through $M_w$ and $M_m$ and combines with the $C_A$ current to thereafter flow into the lower inductor $M_C$ and the lower branch containing $C_A$ in a direction from left to right. Due to the equality, the current in the upper branch is equal and opposite to the current in the lower branch containing $C_A$ and the signals generated in windings 77 and 78 will be equal and opposite to one another.

The combination of a mass on the end of the magnetostrictive arm defines a mass spring system which has a natural resonant frequency. The design of the hydrophone is such that the natural resonant frequency of the mass spring system is designed below the operating frequency range of the hydrophone. By so designing of the system there will result a relatively flat frequency response as illustrated in FIG. 2. This may be demonstrated by again making reference to FIG. 9. When operating above resonance the inductive reactance is much greater than the capacitive reactance for the present situation. Making the assumption again that point 74 is essentially directly tied to point 75, the capacitors $C_A$ present a very low impedance shunt across inductor $M_C$ with the value of capacitive reactance being essentially zero thereby resulting in an equivalent impedance Z for the circuit of $X_{MW}+X_{MM}$. The current provided by the generator F therefore may be determined from the following:

The voltage provided by generator F is:

$$F = \frac{16\pi}{3} \frac{a^3 f \cos\theta}{c} P_{ff}$$

The RMS mechanical velocity U' analogous to current $(i=v/z)$ is $$U = \frac{F}{z} = \frac{\frac{16\pi}{3} a^3 \frac{f \cos\theta}{c} P_{ff}}{2\pi f (X_{MW} + X_{MM})}$$

which reduces to $$U = \frac{8}{3} \frac{a^3 \cos\theta\, P_{ff}}{c\,(X_{MW} + X_{MM})}.$$

The term U' is equivalent to the disk velocity and is directly proportional to the free field acoustic pressure and completely independent of the frequency.

If, however, operation is below resonance the capacitive reactances become predominant, the inductive reactances are negligible and it may be demonstrated that the disk velocity would then vary with the square of the frequency and therefore the final output voltage at terminals 79 would vary with the square of the frequency and the frequency response would not be flat over the range of interest.

Figure 10:
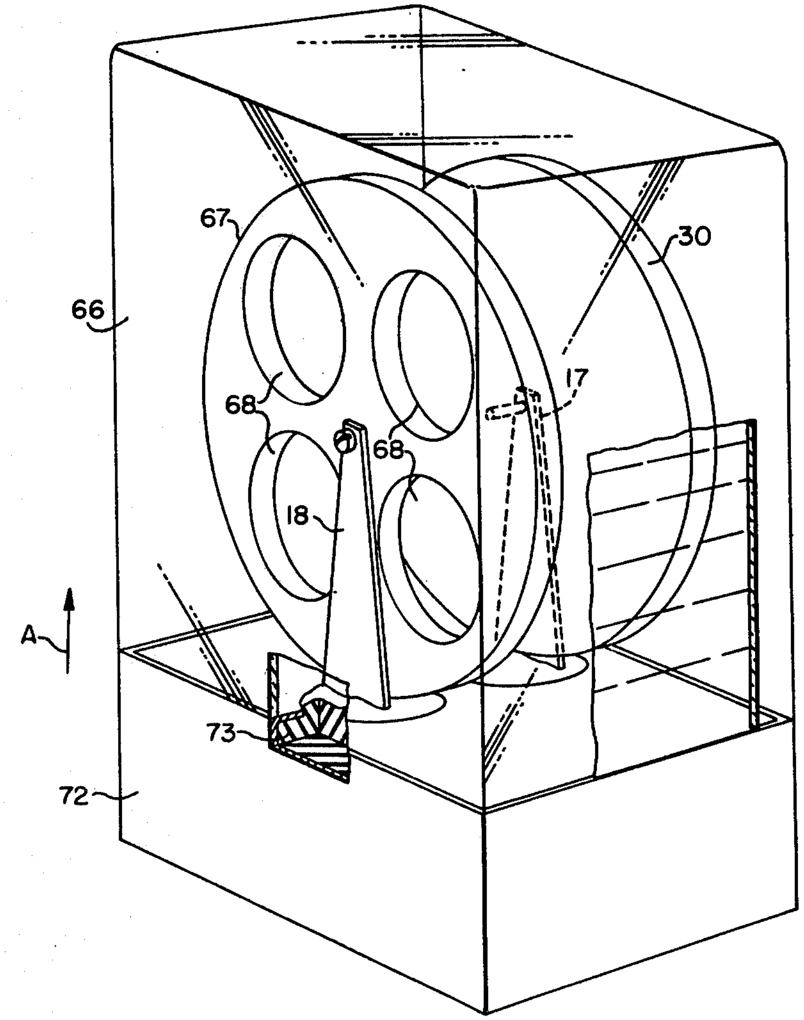
FIG. 10 illustrates, with portions broken away, the hydrophone as it could be used in an ambient medium and further illustrates another type of counterbalancing mass.

The hydrophone may be placed in an ambient medium particle velocity is to be measured. However, in order to insure for long time operation and to insure adequate protection of the hydrophone it is preferable that the hydrophone be installed within a protective envelope. FIG. 10 illustrates one possible arrangement and additionally illustrates another form of counterbalancing mass 67.

The arrangement of FIG. 10 includes the support 72 with the hydrophone being compliantly mounted with respect thereto by the lower portion including the coupling member being potted in a butyl 73. Connected to the support is a cover member 66 with the interior thereof being filled with a transducer fluid such as oil preferably having the same acoustic transmission properties as sea water, if sea water is the ambient medium.

The counterbalancing mass 67 of FIG. 10 is in the form of a flat disk having a plurality of apertures 68 extending therethrough. The provision of the apertures 68 insure that fluid motion passes through the aperatures rather than causing the counterbalancing assembly to respond to the acoustic wave impingement. If movement in the direction of arrow A is contemplated, the disks can each be made in two parts straddling the respective arms, as previously described. Maintaining the same considerations as previously discussed, if the radiation target 30 and counterbalancing mass 67 are of equal sizes (due to the provision of the apertures, however, they are not of equal area) radiation target 30 may be fabricated of aluminum and the counterbalancing mass 67 of stainless steel, by way of example.

What is claimed is:

1. A dipole hydrophone for use in an ambient medium comprising:
(A) a coupling member,
(B) a first magnetostrictive multilaminar arm portion connected to said coupling member;
(C) a second magnetostrictive multilaminar arm portion connected to said coupling member;
(D) each of said arm portions including an end defining a plurality of legs;
(E) means for establishing a magnetic biasing flux in said legs;
(F) winding means disposed about said legs;
(G) a radiation target connected to the other end of said first arm portion and responsive to ambient medium particle velocity to bend said arm portion in response thereto, to provide a corresponding signal in its associated winding means;
(H) a counterbalancing mass connected to the other end of said second arm portion and being constructed to present a substantially smaller area to ambient medium particle velocity, normal to its associated arm portion, than that of said radiation target;
(I) said first and second arm portions being connected to said coupling member such that said winding means are located between said connection and radiation target for said first arm portion, and between said connection and counterbalancing mass for said second arm portion.

2. Apparatus according to claim 1 wherein:
the said end of each said arm portion is slotted such that said winding means may be slipped over respective legs.

3. Apparatus according to claim 2 wherein:
each said one end has a single slot to define two legs.

4. Apparatus according to claim 2 wherein said means for establishing a biasing flux, for each said arm portion includes
(A) a permanent magnet magnetically coupled to said legs; and
(B) a low reluctance magnetic shunt connected between and contacting said legs.

5. Apparatus according to claim 1 wherein:
(A) said radiation target has a central axis;
(B) said counterbalancing mass has a central axis; and
(C) said central axes are coaxial.

6. Apparatus according to claim 1 wherein:
(A) said first arm portion is connected to the center of gravity of said radiation target.

7. Apparatus according to claim 6 wherein said second arm portion is connected to the center of gravity of said counterbalancing mass.

8. Apparatus according to claim 6 wherein said radiation target is of two parts, one part located on one side of said first arm portion and the other part on the other side of said first arm portion.

9. Apparatus according to claim 7 wherein said counterbalancing mass is of two parts, one part located on one side of said second arm portion and the other part on the other side of said second arm portion.

10. Apparatus according to claim 7 wherein:
(A) the winding means associated with said first arm portion are serially connected with the winding means of said second arm portion; and which additionally includes (B) trimming means electrically connected in parallel with a portion of said winding means to dynamically balance said hydrophone operation.

11. Apparatus according to claim 9 wherein said counterbalancing mass is a flat disk having a plurality of aperatures therethrough.

12. Apparatus according to claim 9 which includes:

(A) a support structure, (B) said coupling member being compliantly mounted with respect to said support structure.

* * * * *